United States Patent
Perentes et al.

(10) Patent No.: US 10,405,689 B2
(45) Date of Patent: Sep. 10, 2019

(54) BEVERAGE PRODUCTION DEVICE USING CENTRIFUGATION FOR EXTRACTING A LIQUID COMPRISING HEAT LOSS COMPENSATING MEANS

(71) Applicant: NESTEC S.A., Vevey (CH)

(72) Inventors: Alexandre Perentes, Pully (CH); Alfred Yoakim, St-Legier-la Chiesaz (CH); Jean-Luc Colantonio, Grangettes-Pres-Romont (CH); Andreas Staub, Hettlingen (CH)

(73) Assignee: Societe des Produits Nestle S.A., Vevey (CH)

( * ) Notice: Subject to any disclaimer, the term of this patent is extended or adjusted under 35 U.S.C. 154(b) by 179 days.

(21) Appl. No.: 14/651,701

(22) PCT Filed: Dec. 11, 2013

(86) PCT No.: PCT/EP2013/076172
§ 371 (c)(1),
(2) Date: Jun. 12, 2015

(87) PCT Pub. No.: WO2014/090850
PCT Pub. Date: Jun. 19, 2014

(65) Prior Publication Data
US 2015/0305546 A1  Oct. 29, 2015

(30) Foreign Application Priority Data
Dec. 12, 2012  (EP) .................................... 12196773

(51) Int. Cl.
*A47J 31/22*  (2006.01)
(52) U.S. Cl.
CPC .................................... *A47J 31/22* (2013.01)

(58) Field of Classification Search
CPC .......... A47J 31/22; A47J 31/407; A47J 31/40; A47J 31/401; B65D 85/8043
(Continued)

(56) References Cited

U.S. PATENT DOCUMENTS

| 3,025,781 A | 3/1962 | Bossi | |
|---|---|---|---|
| 5,518,066 A * | 5/1996 | Francis | F28F 9/0219 165/133 |

(Continued)

FOREIGN PATENT DOCUMENTS

| CH | 361104 | 3/1962 |
|---|---|---|
| EP | 1380243 A1 | 1/2004 |

(Continued)

OTHER PUBLICATIONS

Japan Office Action for corresponding Application No. 2015-546991, Dispatch No. 480441, Dispatch Date Oct. 31, 2017, 10 pages.

*Primary Examiner* — Dana Ross
*Assistant Examiner* — Ayub A Maye
(74) *Attorney, Agent, or Firm* — K&L Gates LLP

(57) ABSTRACT

Beverage production device for preparing a liquid extract by interaction between a liquid and food ingredients to form the liquid extract by effect of centrifugation of the liquid passing through the ingredients comprising:
  a brewing unit (2) for receiving the food ingredients,
  a collecting unit (18) for collecting the liquid extract centrifuged outside the centrifugal unit,
  driving means connected to the centrifugal unit for driving the centrifugal unit in rotation,
  liquid supply means being connected to the centrifugal unit to supply liquid in the centrifugal unit,
  wherein the collecting unit (18) comprises a heater (10) for heating the liquid supplied in the centrifugal unit, (Continued)

said heater (10) being further arranged to heat the liquid extract after it leaves the brewing unit (2).

20 Claims, 3 Drawing Sheets

(58) Field of Classification Search
USPC .............................. 99/295, 302 C, 280, 282
See application file for complete search history.

(56) References Cited

U.S. PATENT DOCUMENTS

| | | | |
|---|---|---|---|
| 5,928,699 A * | 7/1999 | Reznik | A23L 3/005 |
| | | | 165/104.27 |
| 5,941,163 A | 8/1999 | Park et al. | |
| 8,950,318 B2 * | 2/2015 | Ford | A47J 31/18 |
| | | | 426/433 |
| 9,295,359 B2 * | 3/2016 | Buttiker | A47J 31/467 |
| 2010/0178392 A1 * | 7/2010 | Yoakim | A47J 31/0642 |
| | | | 426/80 |
| 2011/0189362 A1 * | 8/2011 | Denisart | A47J 31/22 |
| | | | 426/433 |

FOREIGN PATENT DOCUMENTS

| | | |
|---|---|---|
| EP | 1913851 A2 | 4/2008 |
| EP | 1816937 B1 | 11/2010 |
| EP | 2397054 A1 | 12/2011 |
| FR | 1176587 | 4/1959 |
| GB | 1107867 A | 3/1968 |
| JP | 62161331 | 7/1987 |
| JP | 392106 A | 4/1991 |
| JP | 07289437 | 11/1995 |
| WO | 0154551 A1 | 8/2001 |
| WO | 2008148601 | 12/2008 |
| WO | 2010021532 A1 | 2/2010 |
| WO | 2010089329 | 8/2010 |
| WO | 2011144733 A2 | 11/2011 |
| WO | 2011145064 A1 | 11/2011 |

\* cited by examiner

BEVERAGE PRODUCTION DEVICE USING CENTRIFUGATION FOR EXTRACTING A LIQUID COMPRISING HEAT LOSS COMPENSATING MEANS

CROSS REFERENCE TO RELATED APPLICATIONS

The present application is a National Stage of International Application No. PCT/EP2013/076172, filed on Dec. 11, 2013, which claims priority to European Patent Application No. 12196773.1, filed on Dec. 12, 2012, the entire contents of which are being incorporated herein by reference.

FIELD OF THE INVENTION

The present invention relates to a device for producing a liquid comestible from food ingredients, such as coffee powder, by passing a liquid through the ingredients using centrifugal forces. In particular, the invention relates to an improved device and method whereby the liquid comestible is discharged at a suitable hot temperature after centrifugation. Furthermore the invention relates to a collecting unit for such a device.

BACKGROUND OF THE INVENTION

It is known to prepare beverages by separating a mixture consisting of brewed coffee and coffee powder with centrifugal forces. Such a mixture is obtained by the interaction of hot water and ground coffee powder for a defined time. The water is then forced through a screen, on which screen powder material is present.

The existing centrifugal systems suffer the inconvenience that the liquid extract discharged from the device comes at a too low temperature. In particular, the liquid extract is cooled down in the collecting device by heat exchange with the extensive surfaces of the collector of the device. Indeed, according to the principle of the centrifugal process, the brewing unit is rotated along a central axis to form a thin layer or jets of liquid impacting on a substantially tubular impact surface. The liquid comes in contact with and drip from a surface that can be equal, for instance, to a first impact surface if when it is a pure cylinder may have an area of at least about 500 mm². Furthermore, the liquid is normally collected in a U-shaped cavity that leads to at least one dispensing duct forming again extensive areas of contact with the extracted liquid. Furthermore, the receptacle such as a cup further cools the liquid down unless it has been heated before being placed under the device for the reception of the liquid.

Furthermore, it is known that certain beverage ingredients, such as roast and ground coffee, must be brewed with a heated liquid, e.g., hot water, within a particular range of temperature to ensure the full extraction of the ingredients including the capture of the desired aroma compounds. Therefore, the liquid supplied in the brewing unit cannot be overheated to compensate for the temperature losses endured by the liquid after extraction as it would negatively affect the quality of extraction. The range of temperatures for an optimal brewing such as for coffee or tea must be so respected for ensuring the best quality of the final beverage. Furthermore, other quality characteristics of the coffee beverage must be preserved during preparation such as the head of foam called "crema".

It is already known from EP 2393404 A1 to compensate for a temperature loss in a device as described above by using additional heating elements, but these devices are very complex.

The present invention aims at providing a simple device which is easy to produce and to control for compensating at least partially the thermal losses of the beverage (or liquid extract) during its production by centrifugation and so allow the delivery of the beverage at a suitable temperature of service.

The invention also aims at providing a device preserves the gustative and foam characteristics of a coffee beverage.

OBJECT AND SUMMARY OF THE INVENTION

In One Aspect, the Present Invention Relates to a beverage production device for preparing a liquid extract by interaction between a liquid and food ingredients to form the liquid extract by effect of centrifugation of the liquid passing through the ingredients comprising:
  a brewing unit for receiving the food ingredients,
  a collecting unit for collecting the liquid extract centrifuged outside the centrifugal unit,
  driving means connected to the centrifugal unit for driving the centrifugal unit in rotation,
  liquid supply means being connected to the centrifugal unit to supply liquid in the centrifugal unit,
  a heater for heating the liquid supplied in the centrifugal unit,
  wherein the collecting unit comprises a heater for heating the liquid supplied in the centrifugal unit,
  said heater being arranged to furthermore heat the liquid extract after it leaves the brewing unit.

Preferably, the temperature of the liquid extract leaving the device is controlled to be no more than 10 degrees lower, preferably no more than 8 degrees lower than the temperature of the supplied heated liquid in the brewing unit.

Preferably, the collecting unit comprises a collecting cavity, wherein the liquid extract is heated in this collecting cavity. The collecting cavity can for instance be of annular shape.

According to a preferred embodiment of the invention, the collecting cavity can be thermally connected with a heating block of the heater, so that it is heated due to thermal conductivity. When the heater is a thermobloc heater with a massive metal bloc having a high thermal conductivity, this allows it to efficiently heat up the collecting unit without the need for any other additional heating means.

According to a preferred embodiment of the invention, the temperature difference between the collecting cavity and the liquid when it leaves the heater is a function of the liquid flow rate only, i.e. the temperature difference is constant for a given flow rate.

The device can be arranged to produce beverages of different pre-defined volumes, such as "short" coffee beverages of the espresso-type, long and very long coffee beverages, using different flow rates for different beverages. In this case the temperature difference between the collecting cavity and the liquid when it leaves the heater can be held constant for type of beverage having a pre-defined volume and thus a specific flow rate.

Preferably the temperature difference between the collecting cavity and the liquid when it leaves the heater is in a range between 8° C. and 20° C., more preferably between 8° C. and 17° C. The temperature difference can for example be from 8-10° C., preferably around 9° C., for an espresso type coffee (flow rate of 80 ml/min), between 12° C. and 14° C., preferably 13° C. for a medium sized coffee (flow rate of 180 ml/min), and between 15° and 17° C., preferably 16° C., for an extra-long coffee beverage (flow rate of 210 ml/min). The constant temperature difference allows it to always have the ideal parameters for each recipe.

The brewing unit can be configured to receive a dose of food ingredients in a portioned package such as a capsule or pod. Therefore, a rotating drum in the brewing unit may be sized and shaped to form a capsule or pod holder in which is seated a capsule or pod before the brewing operation. The lid may comprise means for injecting the liquid in the capsule or pod and may additionally be provided with inlet piercing means to allow the intrusion of a liquid injection lance. The lid may also comprise at its peripheral outlet piercing means to provide at least one, preferably several peripheral outlets in the capsule or pod for enabling the exit of the liquid from the portioned package. Of course, the pod may as well be a filter pod comprising filter walls permeable to liquids and so which do not require to be pierced.

The collecting unit may comprise an impact wall situated at a distance from the liquid outlet of the brewing unit for receiving said centrifuged liquid extract. The impact wall may be dissociated from said heater.

By "dissociated" it is meant that the wall is not directly heated by the heater that would provide a certain heat compensation by liquid impacting the wall. Indeed, it has been experienced that during impact of the centrifuged liquid with the impact wall, i.e., as soon as liquid leaves the brewing unit (e.g., when it is projected from the capsule) with high centrifugal forces, the foam bubbles tend to collapse against a heated surface. As a result, coffee crema can be seriously deteriorated by a heated impact wall. Therefore, it is preferred to compensate heat loss in the collecting unit only in the receiving cavity and to maintain the compact wall at or close to the ambient temperature to avoid collapsing of the foam bubbles.

The collecting unit may also comprise at least one dispensing duct. The dispensing duct can be a tubular part which is made of one block with the cavity or be associated (e.g., fixed) to it. Several dispensing duct may be provided to distribute the liquid extract in different receptacles (e.g., in two cups).

Heat transfer between a heater block of the heater and the annular collecting cavity can happen via contacting walls or parts, or the heater block and the annular cavity can be made out of one block.

Preferably, the collecting cavity is cooled by liquid circulating in the heater close to said collecting cavity. The liquid does preferably enter the heater in a region close to the collecting cavity, so that the liquid entering the heater usually a ambient temperature cools the collecting cavity down. This allows it to bring the collecting cavity to a temperature which is lower than the temperature of the heater block to which it is thermally connected without the need for an additional heating or cooling element. A particular efficient arrangement combines an annular collecting cavity with a first section of a duct circulating liquid in the heater, said first section being substantially annular as well with a similar cross-section and arranged co-axially below the annular collecting cavity.

In general, the average thickness of the walls of the collecting unit in contact with the liquid extract are dimensioned below 2 mm, preferably below 1 mm, most preferably of about 0.5 mm. Indeed, it has been found particularly effective to reduce the heat dissipation of the liquid extract when contacting the walls of the collecting unit.

For example, for a coffee extract, the brewing temperature of the liquid entering the brewing unit, is comprised within a range 75 and 95° C. More preferably, the device is configured to heat liquid in the heater so that the heated liquid is supplied in the brewing unit at a temperature between 90 and 95° C. The temperature range is selected to ensure an optimal extraction of the ingredients while avoiding burnt flavour notes that are not desired, in particular, for coffee.

The temperature of the heater can be controlled by a control unit and by suitable temperature sensors (e.g., NTC thermistors). This control unit may be the central controller of the device which provides different control functions such as the control of the pump of the liquid supply in the brewing unit.

Figure 1:
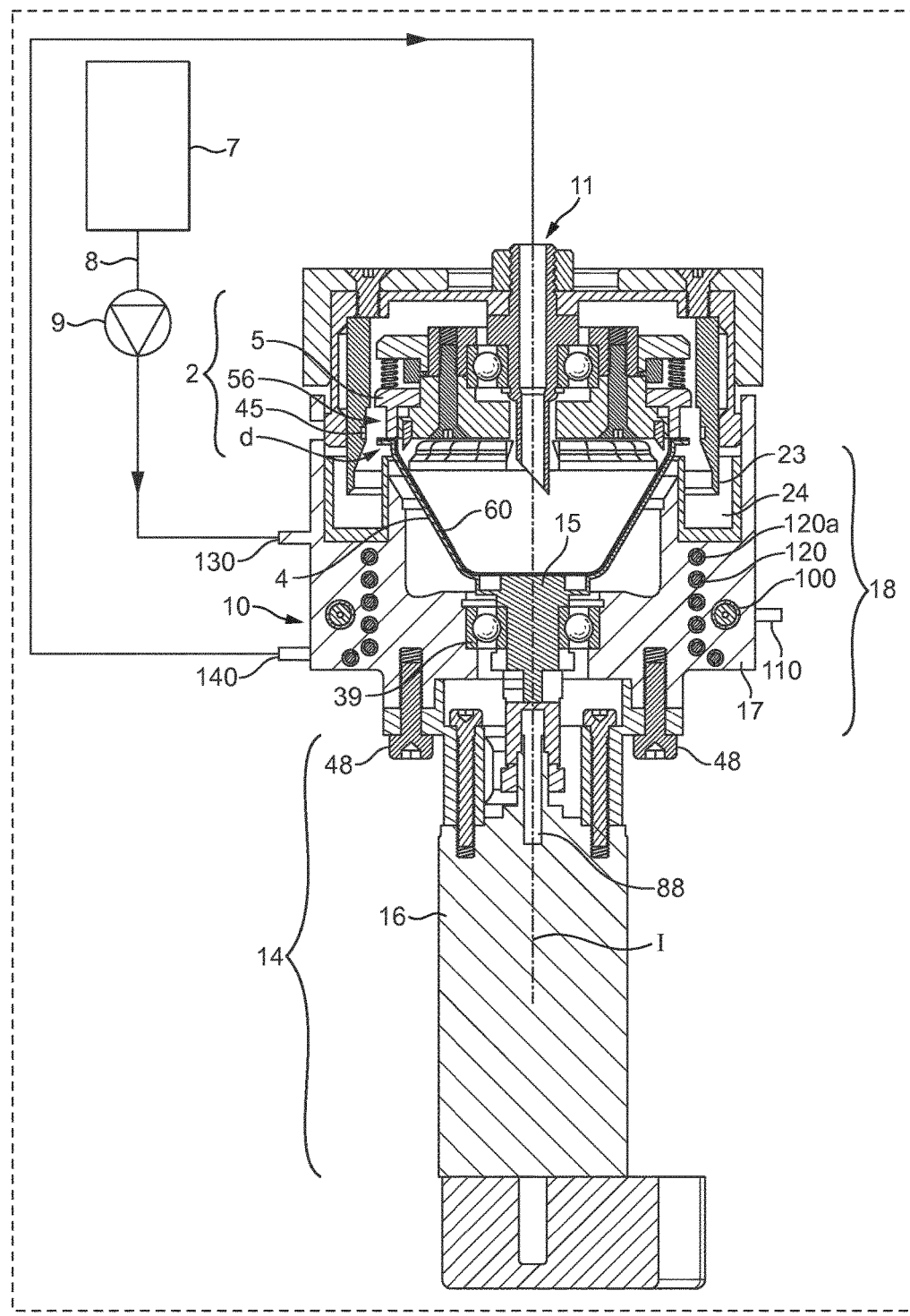
FIG. 1 represents a schematical view of the dispensing device of the present invention with a capsule inside.

The beverage production device 1 of the present invention illustrated in FIG. 1 is configured for preparing a liquid comestible also called liquid extract from the interaction of food ingredients and a liquid by centrifugation in a brewing unit 2. The effect of the centrifugal forces is used to provide the necessary fluid momentum through the ingredients in such a way that a liquid charged with ingredients solids, liquids and aroma compounds are extracted from the brewing unit. The terms "extraction" or "extract" are to be taken in a general meaning as a process or product resulting from the actions of brewing, dissolution, dilution, mixing, emulsifying and combinations thereof.

The brewing unit 2 usually comprises a drum 4 for receiving the food ingredients. The device may be configured to receive food ingredients packaged in a single-serve capsule 60 which takes place in the device when the device is opened. It should be noted that the drum may also be designed as a rotationally driving or driven ring with a central aperture allowing the bottom of the capsule to protrude downwardly. The ring can thus be designed to support the capsule at its side wall and/or rim.

At its top side, the brewing unit comprises a lid 5 which at least partially closes the drum so as to ensure an enclosure for the capsule inserted therein. The brewing unit is connected to a liquid supply duct 6 configured to feed heated liquid in the brewing unit, more particularly, inside the capsule when inserted in the unit. The supply duct 6 ends by a liquid injector 11 which forms a tubular conduit projecting downwards in the brewing enclosure. The liquid is stored in a liquid reservoir 7 and led via a fluid circuit 8 with a pump 9 towards an in-line heater 10 which it enters at an heater inlet 130. The heater 10 will be discussed in more detail below. The heated liquid leaves the heater through an heater outlet 140 and heated liquid is provided to the brewing unit at a certain positive pressure from the reservoir. The liquid is preferably water and the temperature is typically an optimal temperature of brewing which may vary in function of the ingredients to be brewed. For coffee, the temperature may range from about 75 to 95 degrees Celsius. More preferably, the temperature of the supplied liquid is from about 90 to 95° C. to ensure an optimal quality extraction of the coffee. The temperature is here measured in the liquid injector 11 just before the liquid is fed in the capsule.

The water heater can in principle be chosen amongst different heating modules such as a high-inertia thermal bloc (thermoblock), or an ODH ("On Demand Heater") such as a cartridge (e.g., described in EP1913851) or a tube heater embedding one or more thick film or resistor (e.g., described in EP1253844 or EP1380243).

In the present embodiment of the invention, the heater 10 is a high-inertia thermal bloc (thermobloc) which will be explained more in detail below. The pump can be any suitable pump such as a piston pump, a peristaltic pump, a diaphragm pump, a rotary pump, a gravity pump, etc.

Figure 3A:
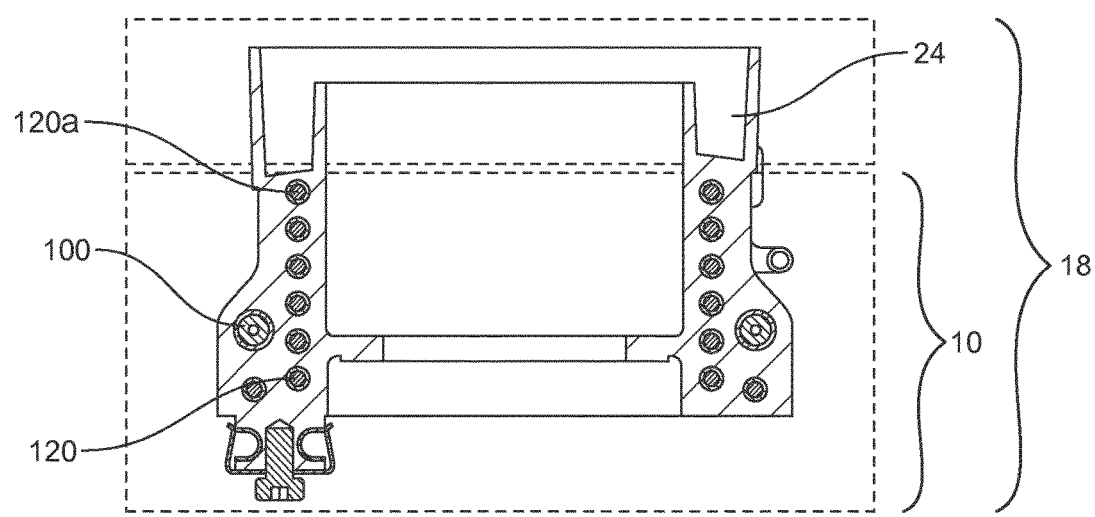
Figure 3B:
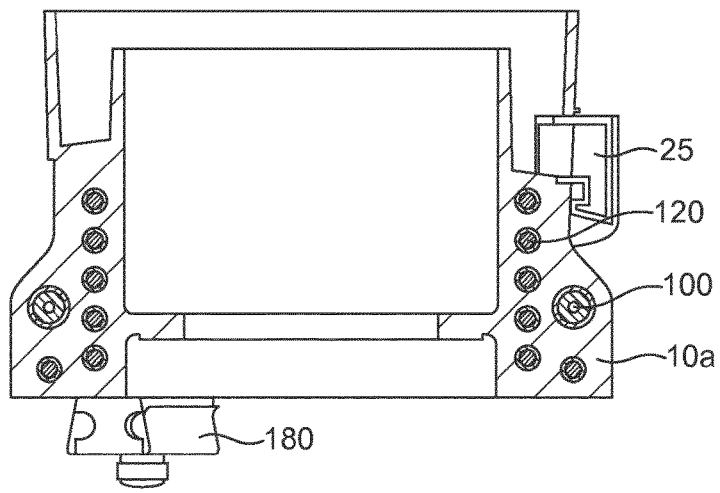
Figure 3C:
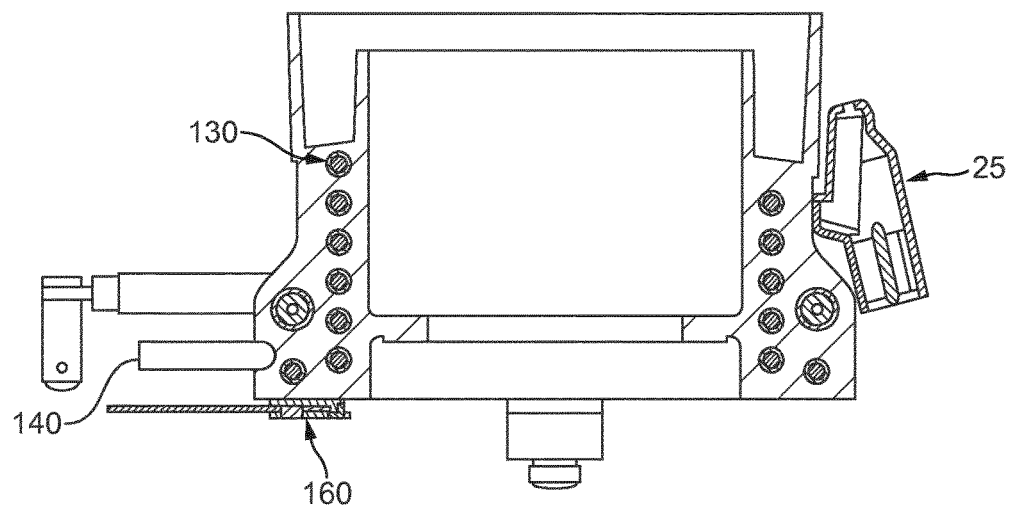

The device further comprises a control unit 12 which is programmed to control the components of the device. In particular, the control unit 12 controls the activation of the pump 9 "on" and "off". This control may result from the activation of a command (e.g. button) on a key board or screen of the device (not shown). The control unit further controls the activation of the heater 10 "on" and "off" for raising the temperature of the liquid at the correct value in the brewing unit. A temperature control loop is provided in the control unit with at least one temperature sensor, here a NTC (negative temperature coefficient) thermistor 160 placed on the surface of the heater 10, as shown in FIG. 3C The liquid injector 11 is mounted in the brewing unit in a manner that the brewing unit can rotate along a central axis I around the injector 11 which is preferably fixed. More particularly, the lid 5 is mounted along ball bearing means 13 so that the lid can rotate when driven on rotation around the injector.

The brewing unit is driven in rotation during the centrifugal process by means of a driving unit 14. The driving unit is preferably connected to the drum 4 via a connecting part 15. The driving unit comprises an electrical motor 16 such as a direct current (DC) motor mounted onto a frame 17 of the device via bolts or the like. The motor 16 comprises a shaft 88 linked to the connecting part 15 via a suitable socket 41. It should be noted that the drum is also mounted in rotational linkage relative to the frame. For this, the connecting part 15 is mounted via ball bearing means 39 to the frame.

Therefore, the brewing unit 2 is rotatably mounted in the device, i.e., between the frame 17 and injector 11. The activation of the motor 16 is also controlled by the control unit 12 to drive the brewing in rotation during the centrifugal process. The speed of centrifugation is set by the controller according to a profile which may be constant or variable. In general, the speed during the extraction phase is between 1000 and 16000 rpm. The speed may be increased or decreased upon needs during the beverage preparation cycle by the control unit.

The liquid extract which is centrifuged in the brewing unit is collected by a collecting unit 18. The brewing unit is further preferably configured to leave a small interstice or liquid outlets at its periphery for the liquid extract to be centrifuged out of the unit. The interstice or liquid outlets is such that a certain pressure is created just upstream of the interstice or outlets, in the enclosure of the brewing unit, e.g., in the capsule. In a preferred mode, a valve means 56 is provided which opens the brewing unit only when a sufficient pressure of liquid is exerted at the inside periphery of the brewing unit. The valve means 56 can be formed by a ring portion 19 which applies a closing force onto the drum and/or edge of the capsule. The valve means further comprises an elastic biasing member 20 which maintains the ring portion in closure tension. The biasing member can be a spring, a rubber elastic or an hydraulic pressure means. The ring portion forms a continuous gap when the valve means is opened by the pressure of the centrifuged liquid. The flow gap or restriction may be very small in width (w), for instance, between 0.01 and 0.5 mm but of a continuous perimeter along the whole periphery of the ring portion. The surface area (S) of the flow gap or restriction may so be calculated by the formula: $S = 2 \cdot \pi \cdot R \cdot w$, where R is the radius of the ring portion and "w" represents the opening width of the valve means. The surface area of the gap can range between 1 and 500 mm$^2$. The surface area varies with the rotational speed such that, usually, the higher the rotational speed the larger the area.

As illustrated in FIG. 1, the lid may further comprise piercing members 21 for piercing several outlets in a wall of the capsule. The piercing members may be placed at the periphery of the lid and directed downwardly in direction of the enclosure. As also apparent in the figure, the capsule may optionally comprise a filter part 22 for separating a main chamber containing the ingredients, e.g., ground coffee, and a small peripheral collecting recess adjacent the pierced upper wall of the capsule. The recess in the capsule is so deep enough, e.g., 5-10 mm, to enable the piercing members to be introduced in the capsule for forming the several outlets.

The collecting unit 18 of the device forms peripheral walls surrounding the brewing unit to collect the liquid which is centrifuged through the small interstice or outlets. In particular, the collecting unit comprises a first impact wall 23 placed at a certain distance or air gap (d) from the brewing unit, in particular, the restriction valve. This impact wall can be a tubular wall forming a surface of impact for the liquid and that extends downwards in a U-shaped collecting part 24 of the collecting unit. The U-shaped collecting part 24 forms a part of the frame 17 or is connected to the frame of the device.

The U-shapes collecting part 24 forms one block with a thermobloc heater 10. This block is shown more in details in FIG. 2 and FIGS. 3A-3B. As already mentioned above, the liquid enters the thermobloc through an inlet 130, is circulated through a heating chamber formed by a helocoidal duct 120 for heating, and leaves the thermobloc through an outlet 140. The duct 120 is preferably made of steel and extending through a (massive) mass of metal forming a substantially cylindrical block 10a, in particular made of aluminium, iron and/or another metal or an alloy, that has a high thermal capacity for accumulating heat energy and a high thermal conductivity for transfer of the required amount of accumulated heat to liquid circulating therethrough whenever needed. According to a preferred embodiment of the invention, the heater block 10a is made of aluminium. It can be made in a die-casting process, wherein it is ejected by two mold halves and a mold core in the center axis. Instead of a distinct duct 120, the thermoblock's duct may be a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. The thermobloc heater 10 includes an annular resistive heating element 100 that convert electrical energy supplied via a connector 110 into heating energy. The heat is supplied to the thermoblock's mass and via the mass, i.e. via the block 10a, to the circulating liquid. The heating elements may be cast or housed into the metal mass or fixed against the surface of the metal mass. The duct(s) may have a helicoidal or another arrangement along the thermoblock to maximise its/their length and heat transfer through the block.

The U-shaped collecting part 24 is in thermal contact with the block 10a of the thermoblock heater 10, and will thus be heated as well in order to compensate for the temperature loss of the liquid during the centrifugation process. However, the temperatures which the block 10a reaches are higher than desired for the collecting part. To ensure that the collecting part 24 is only heated up to a certain temperature which is lower than the temperature of the liquid when it is supplied to the brewing unit, the liquid enters the block 10a through an inlet 130 just below the annular collecting unit 24 and is circulated through a first winding 120a of the helicoidal duct 120 which is arranged below the annular U-shaped collecting unit 24. The collecting unit 24 is thus cooled by the liquid which enters the duct 120 at a temperature which is usually around 20° C., i.e. at ambient temperature. After a few seconds, the collecting unit 24 reaches a temperature which is lower than the temperature of the liquid leaving the heater 10, with the temperature difference being constant for a constant flow rate of liquid through the duct 120. This means that in a system where different flow rates are used for different beverage recipes, e.g. shorter coffees prepared with a lower flow rate, and longer coffees with a higher flow rate, a constant and well-defined temperature difference is obtained for each recipe. In general, the invention allows it to maintain the collected liquid at a sufficiently hot temperature for service (e.g., 60-90° C.) and the temperature losses are minimized or even suppressed, depending on the flow rate of the liquid, and of course on the temperature of the liquid in the reservoir 7 and on the design of the thermobloc heater 10 and the associated collecting unit 24.

The impact wall is dissociated from the U-shaped annular collecting part 24 and is not, or at least not significantly heated. This reduces the risk of breaking the coffee foam ("crema") during the centrifugal projection of the liquid extract from the brewing unit.

Figure 2:
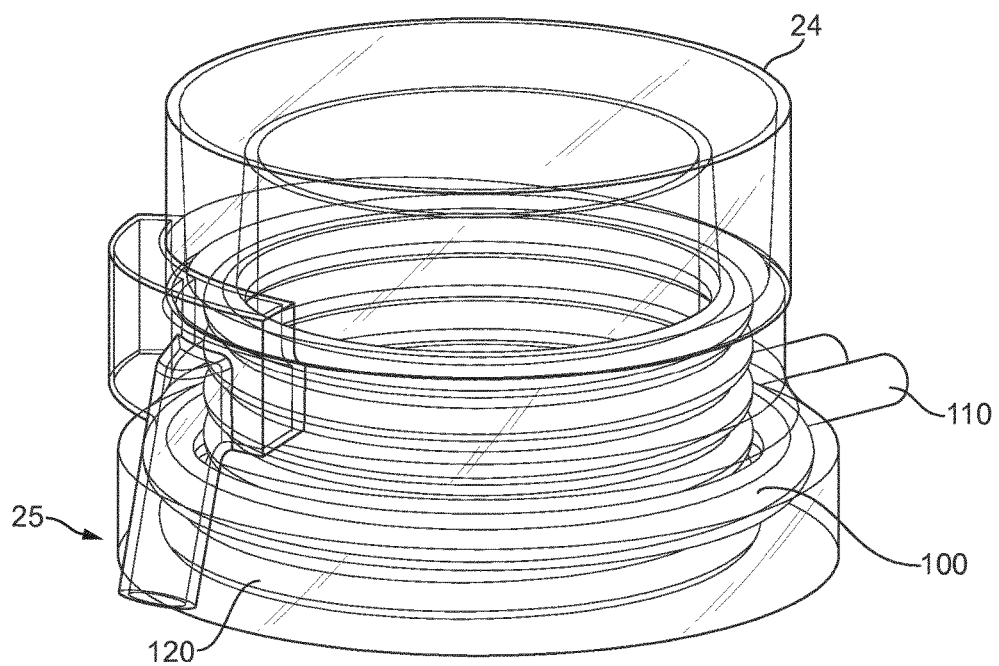
FIG. 2 represents a 3-D view of a collecting unit comprising a heater which is part of the device of FIG. 1, FIGS. 3A, 3B and 3C are cut views along different planes of the collecting unit of FIG. 2.

As shown in FIGS. 2 and 3C, the liquid collected in the annular collecting unit is then dispensed via at least one discharge duct 26. In the context of the present invention, the discharge duct is considered as part of the collecting unit.

It can also be desirable to provide heat reflective walls of the device that can minimize conduction of heat therethrough and can reflect heat towards the liquid extract. Such surfaces may be made, for example, of polymeric support including metallic reflective pigments or coated with a thin metallic membrane (e.g., alu membrane).

The invention claimed is:

1. A beverage production device for preparing a liquid extract by interaction between a liquid and food ingredients to form the liquid extract by effect of centrifugation of the liquid passing through the food ingredients, the beverage production device comprising:
   a brewing unit for receiving the food ingredients;
   a collecting unit for collecting the liquid extract centrifuged outside the centrifugal unit;
   a driver connected to the centrifugal unit for driving the centrifugal unit in rotation; and a liquid supply connected to the centrifugal unit to supply the liquid in the centrifugal unit, the collecting unit comprises a heater for heating the liquid supplied in the centrifugal unit, the heater arranged to heat the liquid extract after the liquid extract leaves the brewing unit, and
   the collecting unit comprises a collecting cavity thermally connected with a heating block of the heater, the heater comprises a duct extending through the heating block, the liquid to be heated enters the heater through a section of the duct, and-the section of the duct is positioned such that the liquid in the section of the duct cools the collecting cavity, and the duct is a helicoidal duct comprising an inlet below the collecting unit a winding of the helicoidal duct arranged below the collecting unit the heicoidal duct configured for the liquid to be heated to enter the heating block through the inlet and be circulated through the winding of the helicoidal duct arranged below the collecting unit.

2. The beverage production device according to claim 1, wherein a temperature of the liquid extract leaving the beverage production device is no more than 10 degrees lower than a temperature of a supplied heated liquid in the brewing unit.

3. The beverage production device according to claim 1, wherein the heater is a thermobloc heater, and the heating block comprises a massive metal block.

4. The beverage production device according to claim 1, wherein the liquid extract is heated in the collecting cavity.

5. The beverage production device according to claim 1, wherein the section of the duct is arranged close to the collecting cavity.

6. The beverage production device according to claim 5, wherein the section extends in parallel to the collecting cavity.

7. The beverage production device according to claim 1, wherein a temperature difference between the collecting cavity and the liquid when the liquid leaves the heater is in a range between 8° C. and 20° C.

8. The beverage production device according to claim 1, wherein after a heat-up time, a temperature difference between the collecting cavity and the liquid when the liquid leaves the heater is a function of a liquid flow rate only.

9. The beverage production device according to claim 1, wherein the brewing unit is configured to leave a small interstice or liquid outlets at a periphery of the brewing unit for the liquid extract to be centrifuged out of the centrifugal unit.

10. The beverage production device according to claim 1, wherein the collecting unit comprises a impact wall placed at a certain distance or air gap from the brewing unit, and a U-shaped collecting part of the collecting unit forms a block with the heater to form a thermobloc including:
    an inlet through which the liquid enters;
    a chamber formed by the helicoidal duct through which the liquid is circulated; and an outlet through which the liquid leaves the thermobloc.

11. The beverage production device according to claim 1, wherein the beverage production device is arranged to produce beverages of different predefined volumes and use different liquid flow rates for the different predefined volumes.

12. The beverage production device according to claim 1, wherein the collecting unit comprises an impact wall dissociated from the heater.

13. The beverage production device according to claim 1, wherein the collecting unit comprises a impact wall placed at a certain distance or air gap from the brewing unit, the impact wall is a tubular wall forming a surface of impact for the liquid and extending downwards in a U-shaped collecting part of the collecting unit which forms a block with the heater to form a thermobloc including:
    the an-inlet through which the liquid enters;
    a chamber formed by the helicoidal duct through which the liquid is circulated;

an outlet through which the liquid leaves the thermobloc; and an annular resistive heating element that converts electrical energy supplied by a connector into heating energy, the heat supplied to a massive metal block of the thermobloc and through the massive metal block, to the liquid, the U-shaped collecting part forming a part of a frame of the beverage production device or being connected thereto.

14. The beverage production device according to claim 1, wherein the heating block is made of a material having a high thermal capacity for accumulating heat energy and a high thermal conductivity for transferring a required amount of accumulated heat to the liquid circulating through the duct.

15. The beverage production device according to claim 1, wherein the collecting cavity abuts or is formed in the heating block.

16. The beverage production device according to claim 1, wherein the collecting cavity and the section of the duct are both annular with similar cross-sections and arranged co-axially.

17. The beverage production device according to claim 12, wherein the impact wall is positioned at a certain distance or air gap from a restriction valve of the brewing unit.

18. A centrifugal unit for a beverage production device, the centrifugal unit comprising:

a brewing unit for receiving food ingredients;

a collecting unit for collecting a liquid extract centrifuged outside the centrifugal unit; a driver connected to the centrifugal unit for driving the centrifugal unit in rotation; and a liquid supply connected to the centrifugal unit to supply a liquid in the centrifugal unit, the collecting unit comprises a heater for heating the liquid supplied in the centrifugal unit, the heater arranged to heat the liquid extract after the liquid extract leaves the brewing unit, and the collecting unit comprising a collecting cavity thermally connected with a heating block of the heater, the heater comprises a duct extending through the heating block, the liquid to be heated enters the heater through a section of the duct, and-the section of the duct is positioned such that the liquid in the section of the duct cools the collecting cavity, and the duct is a helicoidal duct comprising an inlet below the collecting unit and a winding of the helicoidal duct arranged below the collecting unit the heicoidal duct configured for the liquid to be heated to enter the heating block through the inlet and be circulated through the winding of the helicoidal duct arranged below the collecting unit.

19. The centrifugal unit according to claim 18, wherein the section of the duct is arranged close to the collecting cavity, cooling the collecting cavity down to a temperature below a temperature of the liquid exiting the heater to be supplied to the centrifugal unit.

20. The centrifugal unit according to claim 18, wherein the collecting cavity abuts or is formed in the heating block.

* * * * *